United States Patent
Sojourner et al.

(10) Patent No.: US 6,330,099 B1
(45) Date of Patent: Dec. 11, 2001

(54) LIQUID CRYSTAL APRON AND SKIRT ISOLATION FOR SILICON MICRO DISPLAYS

(75) Inventors: Douglas Sojourner, Fremont; Craig Robson, Sunnyvale, both of CA (US); Harold Dean Lewis, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/535,372

(22) Filed: Mar. 24, 2000

(51) Int. Cl.[7] .................. G02F 1/03; G09G 3/36
(52) U.S. Cl. ............... 359/254; 345/87; 345/91; 257/59; 257/72
(58) Field of Search .............. 345/30–104; 359/253, 359/254–256; 257/59, 72

(56) References Cited

U.S. PATENT DOCUMENTS

| | | | |
|---|---|---|---|
| 5,019,002 | * 5/1991 | Holmberg | 445/24 |
| 5,596,451 | 1/1997 | Handschy et al. | 359/633 |
| 5,610,738 | 3/1997 | Sasano et al. | 349/43 |
| 5,712,528 | 1/1998 | Barrow et al. | 313/506 |
| 5,971,538 | 10/1999 | Heffner | 351/137 |
| 5,995,071 | 11/1999 | Mertz | 345/84 |
| 6,175,394 | * 1/2001 | Wu et al. | 349/40 |

FOREIGN PATENT DOCUMENTS

| | | |
|---|---|---|
| 0311979 | 4/1989 | (EP) . |
| 0897128 | 2/1999 | (EP) . |
| 0953959 | 11/1999 | (EP) . |
| 0953960 | 11/1999 | (EP) . |

OTHER PUBLICATIONS

Lawrence Kren, Associate Editor; "Microdisplays Loom Larger"; Electronic—Machine Design, Apr. 8, 1999; pp. 92, 94, 96, & 98; –http://www.machinedesign.com.

Patrick Mannion; "Microdisplays to Enable Portable, High–Information–Content Viewing"; Power, Packaging & Components—pp. 89, 90, 92, 94 & 96. Aug. 9, 1999.

* cited by examiner

Primary Examiner—Georgia Epps
Assistant Examiner—Evelyn A. Lester

(57) ABSTRACT

An apron and a skirt of a spatial light modulator are each coupled to a substrate by reverse-bias diodes. The spatial light modulator includes liquid crystal material between an array of electrodes and a ground electrode. The apron surrounds the array, and the segmented skirt surrounds the apron. The array, apron, and skirt are formed over the substrate. The reverse-bias diodes provide suitable electrical isolation during normal operation, but dissipate excessive charge that might accumulate during plasma etching as the modulator is being manufactured and that might otherwise induce damage due to electrostatic discharge.

18 Claims, 5 Drawing Sheets

US 6,330,099 B1

LIQUID CRYSTAL APRON AND SKIRT ISOLATION FOR SILICON MICRO DISPLAYS

BACKGROUND OF THE INVENTION

1. Field of the Invention

The present invention relates to liquid crystal-based video and graphics display devices, and, in particular, to increasing manufacturing yields for such display devices.

2. Description of the Related Art

A substantial need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. In particular, wearable display devices could be used instead of the conventional displays of laptop and other portable computers. Potentially, wearable display devices can provide greater brightness, better resolution, larger apparent size, greater privacy, substantially less power consumption and longer battery life than conventional active matrix or double-scan liquid crystal-based displays. Other potential applications of wearable display devices are in personal video monitors, in video games and in virtual reality systems.

Miniaturized displays based on cathode-ray tubes or conventional liquid crystal displays have not been successful in meeting the demands of wearable displays for low weight and small size. Of greater promise is a micro display of the type described in U.S. Pat. No. 5,596,451 of Handschy et al. (digital pixel driver) and in European patent application no. 98122934.7 of Walker et al. (analog pixel driver), the disclosures of which are incorporated into this disclosure by reference. This type of micro display includes a reflective spatial light modulator that uses a liquid crystal (LC) material as its light control element. Typically, a ferroelectric liquid crystal (FLC) material is used as the light control element.

When manufacturing the spatial light modulator of the LC-based micro display just described, internal short circuits can develop that lower manufacturing yields, thereby increasing production costs. In order to keep yields high, it is necessary to insure that shorts between the transparent electrode on the cover glass and the top metal on the edge of the spacial light modulator chip will not have adverse circuit consequences,. Previous solutions to this problem have involved connecting this metal to the driving circuit for the transparent (typically made of ITO (Indium Tin Oxide)) electrode, or leaving this metal completely floating. However, the first solution can cause ESD (electrostatic discharge) damage to the ITO circuit, as well as shorts to ground, while the second solution violates manufacturing assumptions required for consistent plasma etching of the metal.

Thus, it can be seen that modern spatial light modulator manufacturing techniques impose manufacturing yield and production cost limits upon LC-based micro displays, and hinder the use of these micro displays in many applications.

Therefore, there is an unresolved need for an improved spatial light modulator manufacturing technique that can increase LC-based micro display manufacturing yields and lower production costs.

SUMMARY OF THE INVENTION

A spatial light modulator manufacturing technique is described that increases LC (Liquid Crystal)-based micro display manufacturing yields and thereby lowers production costs.

Adverse circuit consequences caused by shorts between the transparent electrode on the cover glass and the top metal on the edge of the spatial light modulator chip are avoided during manufacture. First, metal on the edge of the chip is connected to the substrate by way of a reverse-biased diode. This insures that the metal will be correctly biased during plasma etching. Alternatively, the metal on the edge of the chip is connected to the substrate by way of another solid-state device such as a FET (Field Effect Transistor) which can be turned on during power-on-reset (and which has an implicit diode to the substrate).

Second, all other metal layers in this region are also connected only to the substrate in the same fashion as the top metal.

Third, all metal in this region of the chip is segmented into several regions, so that if one segment shorts to one signal or supply, and another shorts to a different signal or supply, those two signals or supplies remain separate. Thus, a short will only occur if a single segment shorts to multiple signals.

Finally, the metal under the fill area, and the metal under the "skirt" (peripheral top metal) on either side of the fill area, are all treated as separate regions in the division just described. This minimizes the chances that a metal short will affect the circuit driving the "apron" (top metal surrounding the array and covered with LC material) will short to the skirt or any other signals or supplies.

By manufacturing liquid crystal on silicon micro displays in this way, one can avoid problems caused by prior isolation techniques, such as ESD (Electro-Static Discharge) damage to the transparent electrode circuit, shorts to ground, and violation of manufacturing assumptions required for consistent plasma etching of the metal.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–6. Those skilled in the art will readily appreciate that the detailed description given herein with respect to these figures is for explanatory purposes, however, because the invention extends beyond these limited embodiments.

Figure 1:
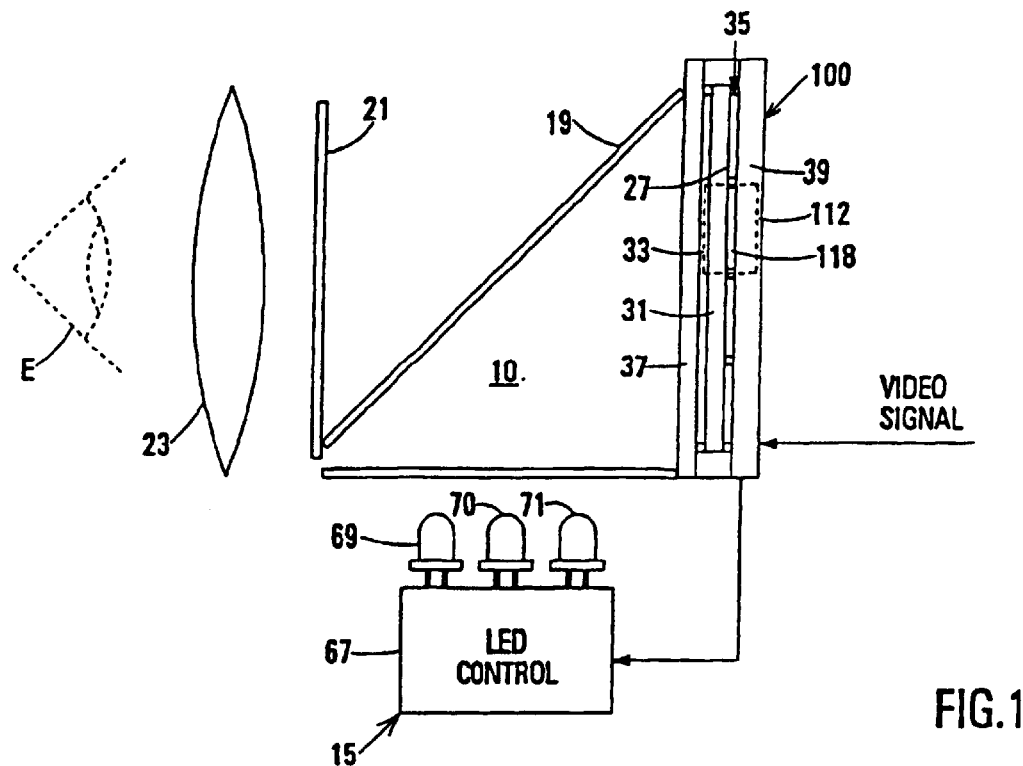
FIG. 1 shows the structure of a display device that incorporates the isolation circuitry according to the invention.

FIG. 1 shows the structure of the display device 10 according to the invention that includes the reflective spatial light modulator 100. Other principal components of the display device are the light source 15, the polarizer 17, the beam splitter 19, the analyzer 21 and the eyepiece 23.

The light source 15 is composed of the LED driver 67 that drives the LEDs 69–71. The LEDs are of different colors and are independently driven in a color display device. Fewer or more LEDs, or other light-emitting devices whose output can be rapidly modulated may alternatively be used as the light source 15. As a further alternative, a white light source and a light modulator may be used. The light modulator modulates the amplitude of the light output by the light source and, in a color display device, additionally modulates the color of the light output.

The light source 15 generates light that passes through the polarizer 17. The beam splitter 19 reflects a fraction of the polarized light from the polarizer towards the spatial light modulator 100. The reflective electrode 35 located on the surface of the substrate 39 of the spatial light modulator reflects a fraction of the incident polarized light. Depending on the electric field across the layer 31 of electro-optical material (the electro-optical layer), to be described below, the direction of polarization of the reflected light is either unchanged or is rotated through 90 DEG. The reflected light passes to the user's eye E through the beam splitter 19, the analyzer 21 and the eyepiece 23.

The eyepiece 23 focuses the light reflected by the reflective electrode 35 at the user's eye E. The eyepiece is shown as a single convex lens in FIG. 1. A more complex optical arrangement may be used to form a low-aberration image of the desired apparent size at the user's eye.

The direction of polarization of the analyzer 21 is aligned parallel to the direction of polarization of the polarizer 17 so that light whose direction of polarization has not been rotated by the spatial light modulator will pass through the analyzer to the user's eye E, and light whose direction of polarization has been rotated through 90 DEG by the spatial light modulator will not pass through the analyzer. Thus, the analyzer prevents light whose direction of polarization has been rotated by the spatial light modulator from reaching the user's eye. Consequently, the spatial light modulator will appear light or dark to the user depending on the applied electric field. When the spatial light modulator appears light, it will be said to be in its ON state, and when the spatial light modulator appears dark, it will be said to be in its OFF state. The direction of polarization of the analyzer can alternatively be arranged orthogonal to that of the polarizer. In this case, the spatial light modulator operates in the opposite sense to that just described. This enables a positive picture to be obtained by illuminating the spatial light modulator during the balance period, to be described below.

The optical arrangement shown in FIG. 1 may also form the basis of a full-size video or graphics display. Such a full-size color display device, (e.g., having a nominal diagonal dimension of 430 mm) can be made by increasing the intensity of the light source 15 and by replacing the eyepiece 23 with magnifying optics that form an image of the reflective electrode 35 on a suitable screen. A single spatial light modulator sequentially illuminated by light of the three primary colors, or parallel spatial light modulators, each illuminated by light of a different primary color, can be used in a full-size color display device.

FIG. 1 additionally shows some details of the spatial light modulator 100. The spatial light modulator is composed of the electro-optical layer 31 sandwiched between the common electrode 33 and the reflective electrode 35. The electrode 33 is transparent and is deposited on the surface of the transparent cover 37. The electrode 35 is located on the surface of the semiconductor substrate 39. As will be discussed below primarilarly in connection with FIGS. 3–5, the present invention provides isolation for electrode 35 during plasma etch.

An electro-optical material is a material having an optical property that depends on an applied electric field. For example, in the optical arrangement shown in FIG. 1, the rotation of the direction of polarization of light impinging on the electro-optical layer depends on the direction of an electric field applied to the layer. In other electro-optical materials, rotation of the direction of polarization may depend on the strength of the electric field applied to the layer. The transmissivity of other electro-optical materials may depend on the electric field applied to the layer.

In the preferred embodiment, the electro-optical material is a ferroelectric liquid crystal material. The direction of the electric field applied between the transparent electrode 33 and the reflective electrode 35 determines whether the direction of polarization of light impinging on the ferroelectric material sandwiched between the electrodes is rotated or not. In other embodiments, a conventional nematic liquid crystal may be used as the electro-optical material. In this case, the strength of the electric field between the electrodes determines whether the direction of polarization is rotated or not.

To enable the display device 10 to display an image instead of merely controlling the passage of light from the light source 15 to the user's eye E, the reflective electrode 35 is divided into a two-dimensional array of pixel electrodes, exemplary ones of which are shown at 118. In addition, a drive circuit (114 in FIG. 2A) that drives the pixel electrode is located in the substrate 39 under each pixel electrode. The drive circuit, the pixel electrode and the portions of the electro-optical layer 31 and the common electrode 33 overlaying the pixel electrode collectively constitute a pixel, an exemplary one of which is shown at 112.

When the electro-optical layer 31 is composed of a ferroelectric material, the direction of the electric field applied between each pixel electrode, such as the pixel electrode 118, and the common electrode 33 determines whether the direction of polarization of the light reflected by the pixel electrode is rotated through 90 DEG or not, and thus whether the corresponding pixel, such as the pixel 112, will appear bright or dark to the user. When the pixel appears light, the pixel will be said to be in its ON state, and when the pixel appears dark, the pixel will said to be in its OFF state.

The optical characteristics of the pixels of the spatial light modulator 100 may be binary: light from the light source 15 and reflected by the pixel either passes through the analyzer 21 to the user's eye E or does not pass through the analyzer to the user's eye. To produce a grey scale, the apparent brightness of each pixel is varied by temporally modulating the light that reaches the user's eye. The light is modulated by choosing a basic time period that will be called the illumination period of the spatial light modulator. The spatial light modulator is illuminated through the illumination period, and each pixel is set to its ON state for a first temporal portion of the illumination period, and to its OFF state for a second temporal portion. The second temporal portion constitutes the remainder of the illumination period, and is thus complementary to the first temporal portion. Alternatively, the OFF state may precede the ON state. The fraction of the illumination period constituted by the first temporal portion, during which the pixel is in its ON state, determines the apparent brightness of the pixel.

Alternatively, this invention may also be used when non-binary modulators (as are often found with nematic LC) are used.

The principles just described may be extended to enable the spatial light modulator to generate a color image. In this case, the spatial light modulator is driven by the color components of a color video signal, and three display periods are defined for each frame of the color video signal, one for each color component. The light source 15 illuminates the spatial light modulator with light of a different color during the illumination period of each display period. Each pixel is set to its ON state for a fraction of each of the three illumination periods, and to its OFF state for the remainder of the illumination period. The fraction of each of the three illumination periods in which the pixel is in its ON state determines the apparent saturation and hue of the pixel. The display periods of a color display may each correspond to one-third of the frame period of the color video signal, for example. Making the display period the same for the three color components is operationally convenient, but is not essential.

Figure 2A:
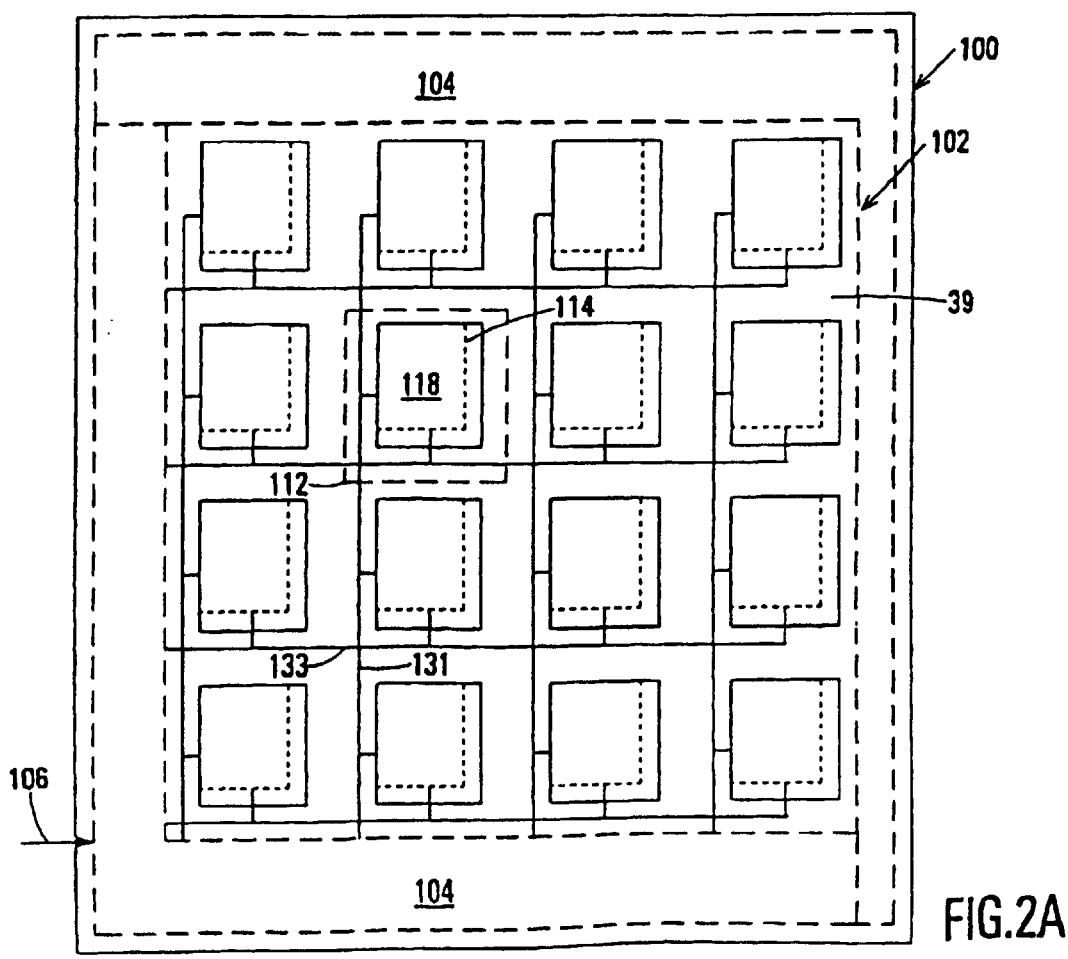
FIGS. 2A–2D show details of the spatial light modulator of the display device shown in FIG. 1.
Figure 2B:
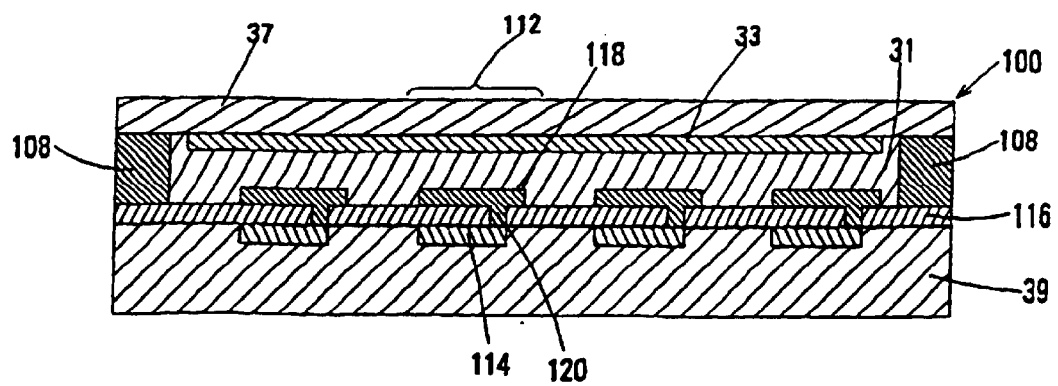

The spatial light modulator 100 will now be described in more detail with reference to FIGS. 2A–2D. Referring first to FIGS. 2A and 2B, the light modulator is composed of the electro-optical layer 31 sandwiched between the transparent cover 37 and the semiconductor substrate 39. The transparent cover, which may be a thin glass plate, for example, is separated from the substrate by the spacers 108. The translucent common electrode 33, which may be a layer of indium tin oxide (ITO), for example, is located on the inside surface of the transparent cover, facing the substrate.

An array 102 of pixels is located on the surface of the substrate 39. The exemplary pixel is shown at 112. The drawings throughout this disclosure show pixel arrays with only four pixels in each dimension to simplify the drawings. In a practical embodiment, the pixel array would be composed of, for example, 640×480, 800×600 pixels, 1280× 1024 pixels, 2044×1125 pixels, or some other acceptable two-dimensional arrangement of pixels.

For each pixel in the pixel array 102, a drive circuit is formed by conventional semiconductor processing on and under the surface of the substrate 39. The analog drive circuit of the exemplary pixel 112 is shown at 114. The analog drive circuit is composed of transistors, capacitors and other circuit elements (not shown) interconnected by one or more layers of conductors (not shown). The analog drive circuits of the pixels constituting the pixel array 102 are connected to one another and to pads through which external electrical connections are made by additional layers of conductors (not shown). The surface of the substrate, and the above-mentioned layers of conductors, are covered by the insulating layer 116. The reflective pixel electrode 118 of the pixel 112 is located on the surface of the insulating layer overlaying the analog drive circuit. The pixel electrode is connected to the output of the analog drive circuit 114 by the conductor 120 which passes through an aperture formed in the insulating layer.

In the pixel 112, the analog drive circuit 114 generates a drive signal that is applied to the pixel electrode 118. The drive signal applied to the electrode has a 1 state and a 0 state. The 1 state may be a high voltage state, and the 0 state may be a low voltage state, for example. The state of the drive signal applied to the pixel electrode determines whether or not the portion of the electro-optical layer 31 overlaying the pixel electrode rotates the direction of polarization of light falling on the pixel, as described above. The analog drive circuit sets the apparent brightness of the pixel by applying the drive signal to the pixel electrode in response to an analog sample derived from a video signal. During each above-described illumination period the drive signal starts in one state, corresponding to the ON state of the pixel, for example, and remains there for the first temporal portion. Before the end of the illumination period, the drive signal switches to the other state and remains there for the second temporal portion. The fraction of the illumination period for which the pixel is in its ON state determines the apparent brightness of the pixel. When the video signal is a color video signal, the analog drive circuit sets the apparent saturation and hue of the pixel by applying drive signals that turn the pixel ON for fractions of three consecutive illumination periods that depend on the three color components of the color video signal.

FIG. 2A shows the pixels arranged in the two-dimensional pixel array 102 on the surface of the substrate 39. The sample derivation and distribution circuit 104 is also formed in the substrate 39. This circuit distributes samples derived from the video signal received via the video input 106 to the pixel array and generates the various timing and control signals required by the pixel array. Signals are distributed from the sample derivation and distribution circuit to the pixels by busses, representative ones of which are shown schematically at 131 and 133.

Figure 2C:
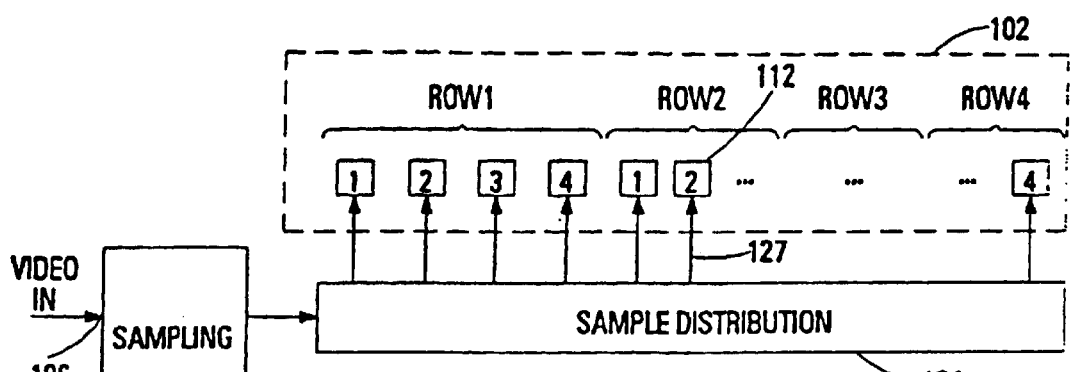

FIG. 2C is schematic representation of the electrical arrangement of the spatial light modulator 100. The sampling circuit 122 receives a video signal via the video input 106 and derives a stream of samples from the video signal. The samples are distributed to the pixels constituting the pixel array 102 by the sample distribution circuit 124. Each pixel receives at least one sample of each frame of the video signal. The location in the frame of the video signal whence the sample is derived corresponds to the location of the pixel in the pixel array.

Figure 2D:
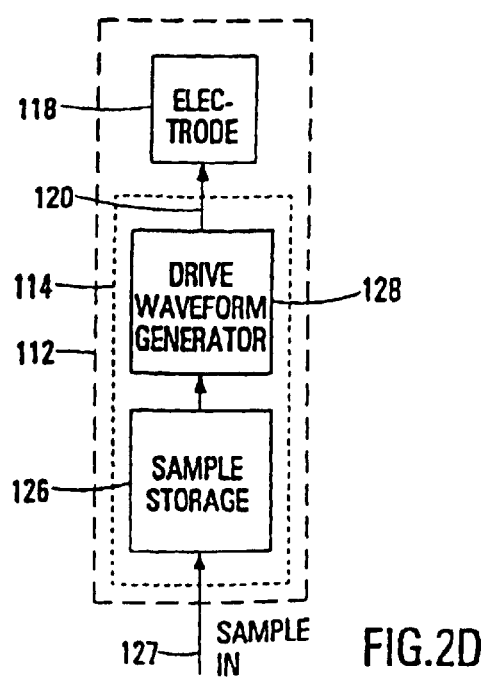

FIG. 2D is a schematic representation of the electrical arrangement of the pixel 112 in the two-dimensional pixel array 102. The remaining pixels have the same electrical arrangement. The pixel is composed of the drive circuit 114, the output of which is connected to the electrode 118 by the conductor 120. The drive circuit is composed of the sample selection section 126, and the drive signal generator 128. The sample selection section has a sample input 127 connected to the sample distribution circuit 124 (FIG. 2C). During each frame of the video signal, the sample selection section receives a sample derived from the video signal via the sample input and temporarily stores the sample until the sample is needed by the drive signal generator 128.

The drive signal generator 128 receives each sample stored in the sample selection section 126 during the picture period of the previous frame and, in response to the sample, generates a drive signal and applies the drive signal to the electrode 118. The drive signal generator generates the drive signal with a period corresponding to the above-described display period.

The display period of each frame begins immediately after the end of the display period of the previous frame. In some embodiments, the drive waveform is generated intermittently, and a period in which the drive signal is generated in a neutral state is interposed between consecutive display periods.

The waveforms just described are those required to drive a electro-optical material that lacks a bistable characteristics. However, it will be apparent to a person of ordinary skill in the art that circuits for generating such waveforms can easily be adapted to generate the waveforms required to drive a bistable electro-optical material. For example, a drive circuit capable of generating the waveforms just described can be adapted to drive a bistable electro-optical material by capacitatively or a.c. coupling the output of the circuit to the pixel electrode.

Figure 3:
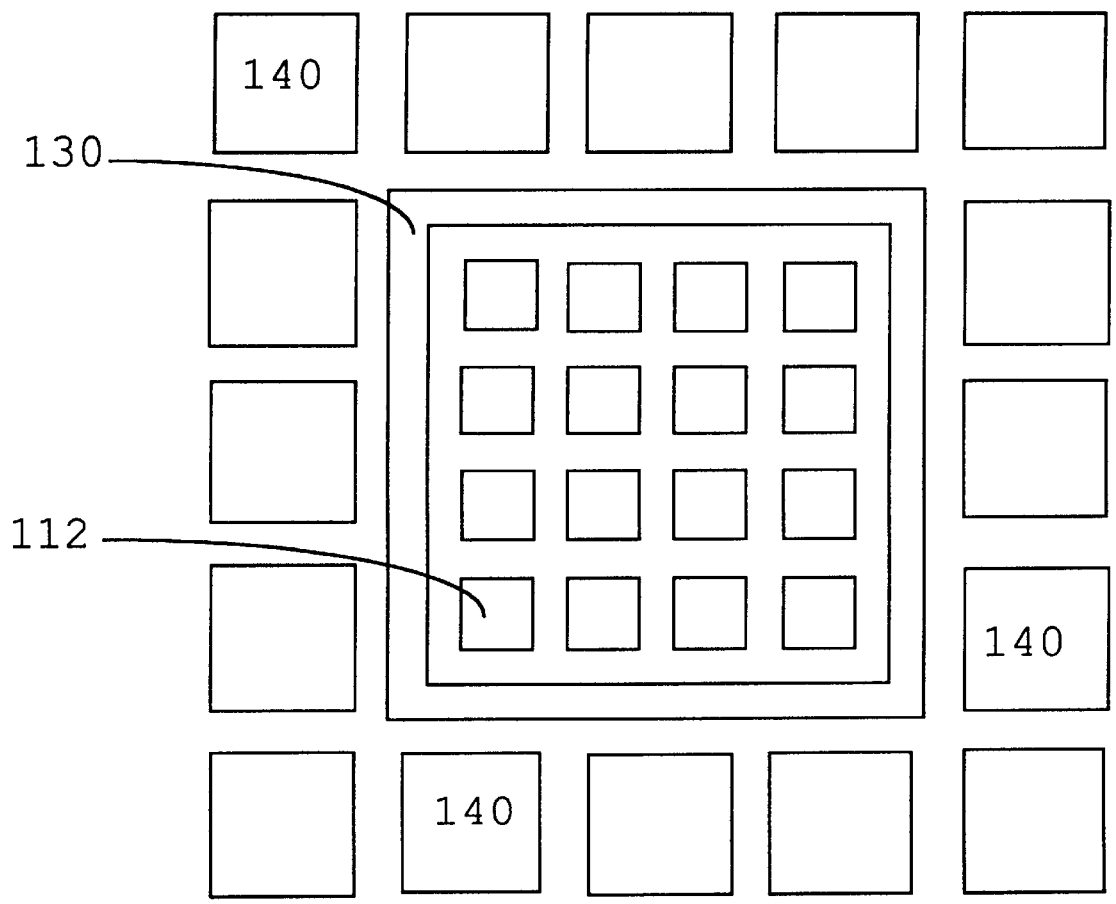
FIG. 3 is a diagram illustrating a skirt and apron for a liquid crystal display according to the present invention.

Referring now to FIGS. 3–6, a spatial light modulator manufacturing technique is described that increases LC-based micro display manufacturing yields and thereby lowers production costs. FIG. 3 is a diagram illustrating a skirt and apron for a liquid crystal display according to the present invention. In FIG. 3, reflective pixel electrode 118 is one part of 4×4 array 102 of pixels 112. An "apron" 130 is formed by the top metal which surrounds the array and which is covered with LC material. For image quality reasons, this apron needs to be driven, usually in the same way a black pixel would be driven. A "skirt" of the peripheral top metal is formed by skirt portions 140 on each side of the fill area.

Figure 4:
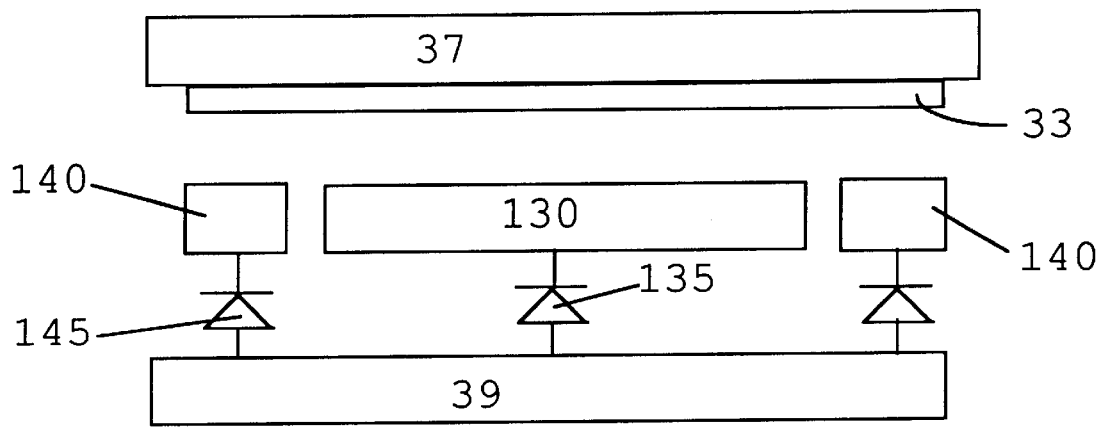
FIG. 4 is a diagram illustrating skirt and apron isolation according to the present invention.

FIG. 4 is a diagram illustrating skirt and apron isolation according to the present invention. Adverse circuit consequences caused by shorts between the transparent common electrode 33 on the transparent cover 37 and the top metal on the edge of the spatial light modulator chip are avoided during manufacture by reverse biased diodes 135 and 145. The transparent (or translucent) cover 37 is preferably a thin glass plate and the transparent (or translucent) common electrode 33 is preferably a layer of ITO (Indium Tin Oxide). ITO is a mixture of the oxides $In_2O_3$ and $SnO_2$. ITO may be required on both sides of the display. ITO can be formed by using vacuum evaporation (and sputtering for example) or plasma-assisted electron evaporation.

First, apron 130 metal on the edge of the chip is connected to the substrate 39 by way of a reverse-biased diode 135. This insures that the metal will be correctly biased during plasma etching to prevent formation of crossover or intra-level shorts, which are a major obstacle to achieving high yields. Plasma etch will develop a charge on the metal. Without discharge, the metal will repel plasma and the geometry-dependent etching will not be effective. Ideally, the metal would be allowed to float, but the metal should be biased for plasma etch. Diode 135 prevents charge accumulation from the plasma.

Figure 5:
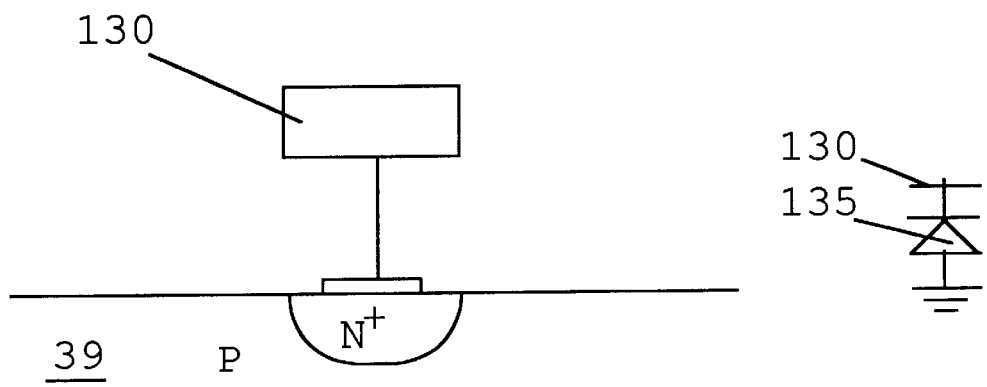
FIG. 5 illustrates use of a diode structure for isolation according to an embodiment of the present invention.

FIG. 5 illustrates use of a diode structure for isolation according to an embodiment of the present invention. As apron 130 goes positive, the n-well within substrate 39 will change to positive. During normal operation, the skirt is not clamped. Note that this embodiment does not require an epitaxial process to reduce the risk of a latch up, but could clamp ITO to ground—one diode drop if there is a short.

Alternatively, the metal on the edge of the chip is connected to the substrate by way of another solid-state device, such as a FET (Field Effect Transistor), which can be turned on during power-on-reset (and which has an implicit diode to the substrate). Thus, because the FET has an implicit diode built in, rather than floating the skirt during operation, you can ground and release it. If the skirt is not shorted, it will remain at a low voltage. If a short has occurred, when the short is released, it will follow the signal to which it is shorted.

Figure 6:
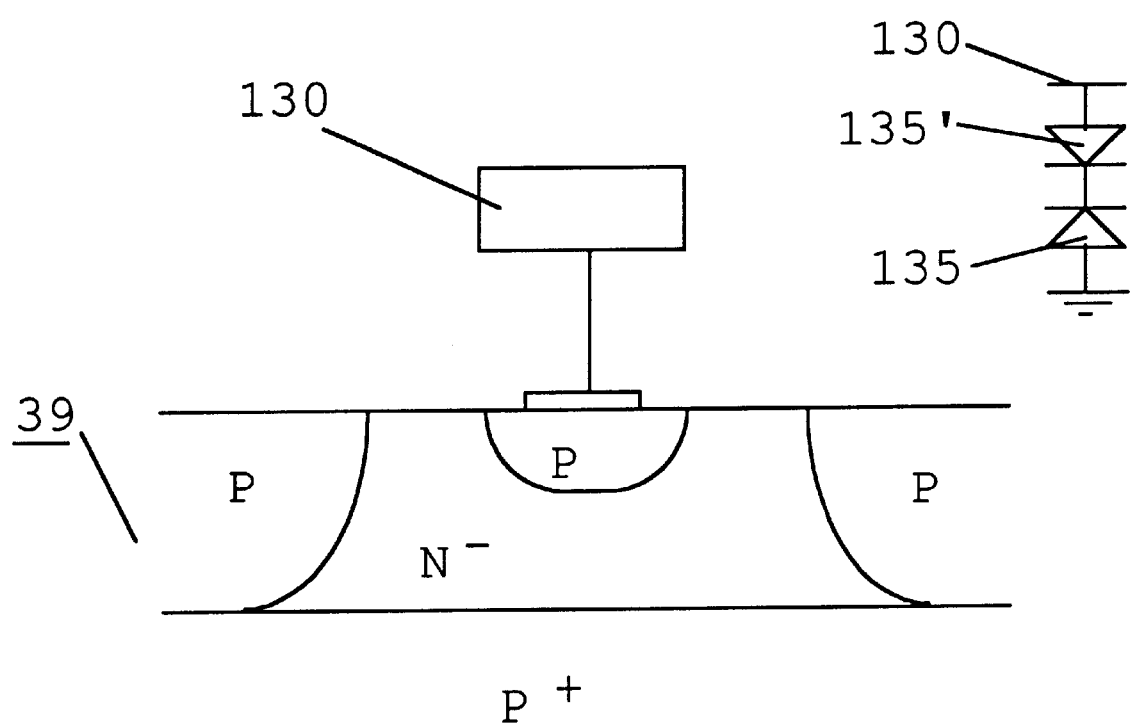
FIG. 6 illustrates use of a double diode structure for isolation according to an embodiment of the present invention.

FIG. 6 illustrates use of a double diode structure for isolation according to an embodiment of the present invention. As the voltage on apron 130 goes down, diode 135' will be off. Similarly, as the voltage on apron 130 goes up, diode 135 will be off. Note that this embodiment does not clamp the ITO but may require care regarding latch up which is why there is a P+ bulk portion of substrate 39.

Second, as is the case with the apron 130, all other metal layers in this region are also connected only to the substrate in the same fashion as the top metal.

Third, (referring back to FIG. 3) all metal in this region of the chip is segmented into several regions, so that if one segment shorts to one signal or supply, and another shorts to a different signal or supply, those two signals or supplies remain separate. Thus, a short will only occur if a single segment shorts to multiple signals.

Finally, the metal under the fill area, and the metal under the peripheral top metal skirt on either side of the fill area, are all treated as separate regions in the division just described. This minimizes the chances that a metal short will affect the circuit driving the top metal apron, surrounding the array and covered with LC material, will short to the skirt or any other signals or supplies.

By manufacturing liquid crystal on silicon micro displays in this way, one can avoid problems caused by prior isolation techniques, such as ESD damage to the ITO circuit, shorts to ground, and violation of manufacturing assumptions required for consistent plasma etching of the metal.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An spatial light modulator, having a liquid crystal material between a common electrode and an array of pixel electrodes, comprising:
    an apron surrounding the array;
    a substrate; and
    a reverse biased apron diode coupling the apron to the substrate.

2. The modulator as set forth in claim 1, comprising a skirt peripheral about the apron.

3. The modulator as set forth in claim 2, wherein the skirt is comprised of a plurality of physically separate portions.

4. A spatial light modulator, having a liquid crystal material between a common electrode and an array of pixel electrodes, comprising:
    an apron surrounding the array;
    a substrate;
    a reverse biased apron diode coupling the apron to the substrate;
    a skirt peripheral about the apron; and
    at least one reverse biased skirt diode coupling the skirt to the substrate.

5. The modulator as set forth in claim 4, wherein the skirt diode is part of a Field Effect Transistor.

6. A spatial light modulator, having a liquid crystal material between a common electrode and an array of pixel electrodes, comprising:
    an apron surrounding the array;
    a substrate;
    a reverse biased apron diode coupling the apron to the substrate; and
    a skirt peripheral about the apron, said skirt including a plurality of physically separate portions, wherein at least two of the portions are coupled to the substrate by corresponding skirt diodes.

7. The modulator as set forth in claim 6, wherein at least one of the skirt diodes is part of a Field Effect Transistor.

8. A spatial light modulator, having a liquid crystal material between a common electrode and an array of pixel electrodes, comprising:
- a skirt peripheral to the array;
- a substrate; and
- a reverse biased skirt diode coupling the skirt to the substrate.

9. The modulator as set forth in claim 8, comprising an apron surrounding the array, the skirt being peripheral to the apron.

10. The modulator as set forth in claim 8, wherein the skirt diode is part of a Field Effect Transistor.

11. The modulator as set forth in claim 8, wherein the skirt is comprised of a plurality of physically separate portions, wherein at least two of the portions are coupled to the substrate by corresponding skirt diodes.

12. The modulator as set forth in claim 11, wherein at least one of the skirt diodes is part of a Field Effect Transistor.

13. A display device having the modulator of claim 8.

14. In a manufacturing process for a spatial light modulator, the modulator having a liquid crystal material between a common electrode and an array of pixel electrodes, the step of:
- coupling an apron surrounding the array to a substrate using a reverse biased apron diode.

15. A manufacturing process for a spatial light modulator, the modulator having a liquid crystal material between a common electrode and an array of pixel electrodes, the process comprising:
- coupling an apron surrounding the array to a substrate using a reverse biased apron diode; and
- coupling a skirt peripheral about the apron to the substrate using at least one reverse biased skirt diode.

16. A manufacturing process for a spatial light modulator, the modulator having a liquid crystal material between a common electrode and an array of pixel electrodes, the process comprising:
- coupling an apron surrounding the array to a substrate using a reverse biased apron diode; and
- coupling a skirt peripheral about the apron to the substrate, wherein the skirt is comprised of a plurality of physically separate portions, and wherein at least two of the portions are coupled to the substrate by corresponding reverse biased skirt diodes.

17. A manufacturing process for a spatial light modulator, the modulator having a liquid crystal material between a common electrode and an array of pixel electrodes, the process comprising:
- coupling a skirt, peripheral to the array, to a substrate using at least one reverse biased skirt diode.

18. The process as set forth in claim 17, wherein the skirt is comprised of a plurality of physically separate portions, and wherein at least two of the portions are coupled to the substrate by corresponding reverse biased skirt diodes.

* * * * *